(12) United States Patent
Watanabe (10) Patent No.: US 9,354,085 B2
(45) Date of Patent: May 31, 2016

(54) ANGLE DETECTING DEVICE WITH COMPLEX SELF-CALIBRATION FUNCTION

(75) Inventor: Tsukasa Watanabe, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 1058 days.

(21) Appl. No.: 13/508,701

(22) PCT Filed: Oct. 27, 2010

(86) PCT No.: PCT/JP2010/069022
§ 371 (c)(1),
(2), (4) Date: Jun. 8, 2012

(87) PCT Pub. No.: WO2011/055661
PCT Pub. Date: May 12, 2011

(65) Prior Publication Data
US 2012/0245876 A1 Sep. 27, 2012

(30) Foreign Application Priority Data
Nov. 9, 2009 (JP) ................................. 2009-255714

(51) Int. Cl.
*G01C 17/38* (2006.01)
*G01D 5/244* (2006.01)
(52) U.S. Cl.
CPC ................................. *G01D 5/24452* (2013.01)
(58) Field of Classification Search
CPC ............ G01D 5/24476; G01D 5/2448; G01D 5/2449; G01D 5/24452; G01D 5/3473
USPC ................................. 702/94, 95, 97, 104, 106
See application file for complete search history.

(56) References Cited

U.S. PATENT DOCUMENTS

| 4,931,949 A | 6/1990 | Hernandez et al. |
| 7,143,518 B2 * | 12/2006 | Watanabe .......... G01D 5/24452 33/1 PT |

(Continued)

FOREIGN PATENT DOCUMENTS

| CN | 101371105 A | 2/2009 |
| JP | 2006-98392 A | 4/2006 |

(Continued)

OTHER PUBLICATIONS

International Search Report issued in PCT/JP2010/069022 dated Dec. 14, 2010.

(Continued)

*Primary Examiner* — An Do
(74) *Attorney, Agent, or Firm* — Birch, Stewart, Kolasch & Birch, LLP (57) ABSTRACT

An angle detecting device with a self-calibration function has sensor heads for reading a scale of a scale disc fixed to a rotating shaft, has first sensor heads and a second sensor head at a position of one of the first sensor heads, in which the first and second sensor heads are calibrated with a first group including L sensor heads and a second group including M sensor heads, respectively arranged with a different equiangular interval, and in which phases of the calibration values obtained from the second group, are shifted by $j*P/L$ ($j=1$ to $L-1$), where P is the total number of scale marks, and average values of the calibration values from the second group and the shifted calibration values are obtained, the average values are added to the calibration values from the first group, and the added values are output as calibration values.

2 Claims, 8 Drawing Sheets

(56) References Cited

U.S. PATENT DOCUMENTS

2006/0043964 A1    3/2006    Watanabe et al.
2010/0181468 A1    7/2010    Nakamura et al.

FOREIGN PATENT DOCUMENTS

JP    3826207 B2    9/2006
WO    WO 2007/086160 A1    8/2007

OTHER PUBLICATIONS

Chinese Office Action dated Apr. 30, 2014, issued in corresponding Chinese Patent Application No. 201080050382.9.

Zhengjia He et al.; The Principle and Application of Signal Time Domain Average; Signal Processing, vol. 2, No. 4, pp. 236-0243, 1986.

\* cited by examiner

ANGLE DETECTING DEVICE WITH COMPLEX SELF-CALIBRATION FUNCTION

TECHNICAL FIELD

The present invention relates to an angle detecting device, such as a rotary encoder, for detecting a rotation angle, and specifically, the present invention relates to an improvement of an angle detecting device with a self-calibration function, capable of determining a calibration value of a scale including an angular error generated by the influence of change of the angle detecting device with the aging variation or the like, an eccentricity of an attached shaft under the environment to be used included in angle information that is output from the angle detecting device, by having the self-calibration function.

BACKGROUND ART

Figure 1:
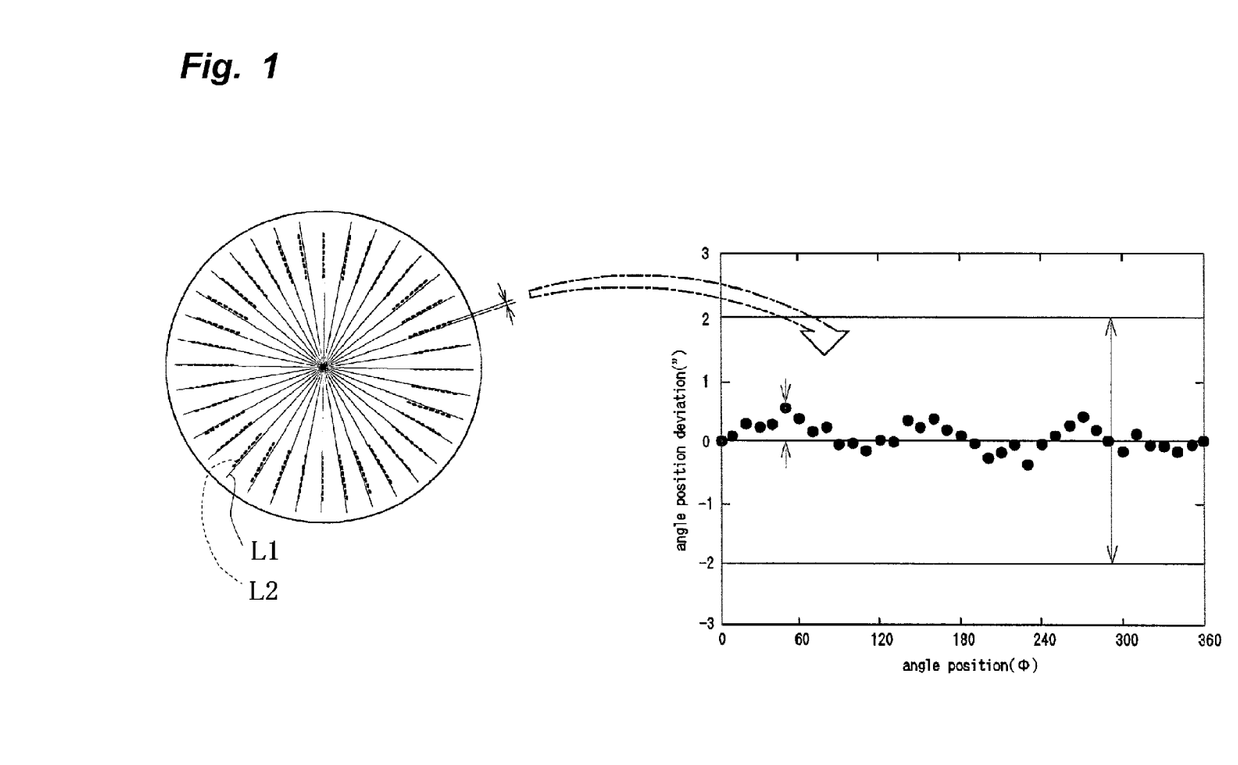
FIG. 1 is a figure illustrating a principle of a rotary encoder.

The general principle of an angle detecting device, such as a rotary encoder, is as follows. The angle detecting device is a device having scale marks written at a circumference of a circular scale disc, and a sensor head for counting a scale, to count the number of scale marks, thereby outputting angle information. Various kinds of devices are used as the angle detecting device. Since the angle detecting device has scale marks written artificially, the scale lines are not written equiangularly, thus the angle information obtained from the positions of the scale lines involves an error. In FIG. 1, a radial line L1 is an ideal scale line position (equiangular interval line), and a short radial broken line L2 is an actual scale line position. A graph in the right of FIG. 1 is obtained by plotting a difference from the ideal position.

The points in the drawing in the right in FIG. 1 are calibration values of scale lines of the angle detecting device. FIG. 1 shows 36 scale lines as depicted, but actually, the angle detecting device has several thousand to several hundred thousand scale lines. A method for calibrating these lines includes several methods for self-calibrating the lines, by comparing the scales of the two angle detecting device with each other. In this method, even if the two angle detecting devices are not calibrated, they can be calibrated at a time, and thus it is not necessary to prepare a more accurate angle detecting device at a higher level. It should be noted that the meaning of the self-calibration is that, even when two angle detecting devices of which angular errors are unknown are compared, the calibration values which are angular errors of both of the devices can be found at the same time.

In the national standard device of angle (angle measuring device), an angle detecting device residing inside of the angle measuring device and an angle detecting device to be calibrated that is provided thereabove, are calibrated using self-calibration method according to the equal-division-averaging method.

Figure 2:
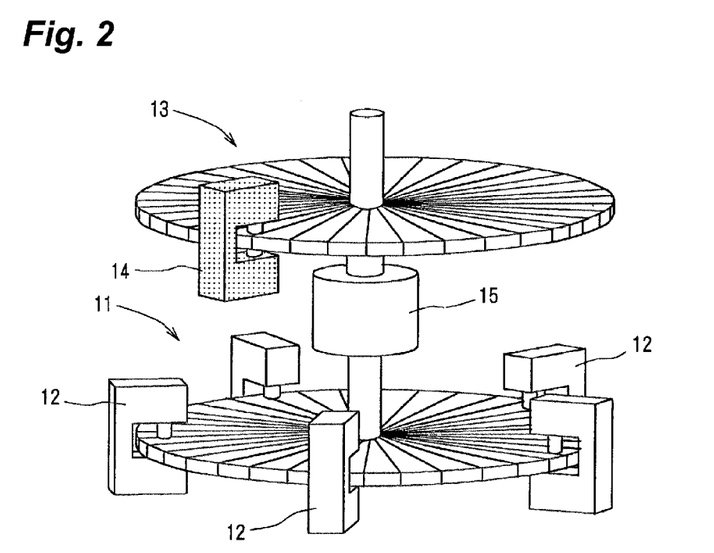
FIG. 2 is a figure illustrating an angle detecting device using the equal-division-averaging method.

The equal-division-averaging method will be simplified and briefly explained with reference to FIG. 2. A difference (SA1) of a scale signal is measured between one of first sensor heads 12, 12 . . . arranged on a scale disc of a first angle detecting device 11 at a lower side and a second sensor head 14 arranged on a scale disc of a second angle detecting device 13 at an upper side. Then, a difference (SA2) is measured in the same manner between another adjacent sensor head 12 at the lower side and the second sensor head 14 at the upper side. Likewise, differences (SA1, SA2, SA3, SA4, SA5) are measured between other first sensor heads 12 and the second sensor head 14, and an average value SAV of those differences is determined, so that a calibration curve of the second angle detecting device 13 at the upper side can be obtained.

When an angular error that is output from the first angle detecting device 11 at the lower side is denoted as $a_i$, and an angular error that is output from the second angle detecting device 13 at the upper side is denoted as $b_i$, the difference is $SAj = b_i - a_{i+(j-1)N/M}$ and, and the average value SAV is as follows.

$$SAV_i = \frac{1}{N} \sum_{j=1}^{N} SAj_i$$

$$= b_i - \frac{1}{N}(a_i + a_{i+P/N} + \cdots + a_{i+(j-1)P/N} + \cdots + a_{i+(N-1)P/N})$$

Herein, i=1, 2, 3 . . . , N is the number of the scale line, N denotes the total number of scale marks provided on the scale disc.

When five first sensor heads 12 are provided, the first sensor heads 12 are arranged with an angular interval of one-fifth of 360 degrees around a circle. When N angle detecting devices are provided, the first sensor heads 12 are arranged with an equal angular interval of one N-th in the same manner. This is called the equal-division-averaging method.

The applicant (assignee) proposed an angle detecting device with a self-calibration function, in which, as shown in Patent Literature 1 below, when calibrating the angle detecting device, the angle detecting device can constantly make accurate calibration, by making it possible to obtain calibration values of a scale including, e.g. the influence of axis eccentricity of the angle detecting device itself and change of the angle detecting device with the aging variation, in order to eliminate the error caused by the axis eccentricity occurred in the time of connection of a rotating shaft with the angle detecting device in a calibration device, and in which the size of the angle detecting device can be reduced.

According to one described in Patent Literature 1, an angle detecting device having sensor heads at a circumference of a scale disc fixed to a rotating shaft, includes a plurality of first sensor heads at the circumference of the same scale disc, and a second sensor head, in which measurement differences between the second sensor head and the first sensor heads are obtained to determine an average value thereof, to perform self-calibration on the basis of this average value, whereby the angle detecting device can detect, e.g. the calibration values of the scale as well as errors due to connection of the rotating shaft, and moreover, even while the angle detecting device is used, calibration operation can be performed readily as necessary without performing connection operation of the rotating shaft, and accurate measurement can be performed for a long period of time in a stable manner.

CITATION LIST

Patent Literatures

Patent Literature 1: Japanese Patent No. 3826207

SUMMARY OF INVENTION

Technical Problem

Figure 3:
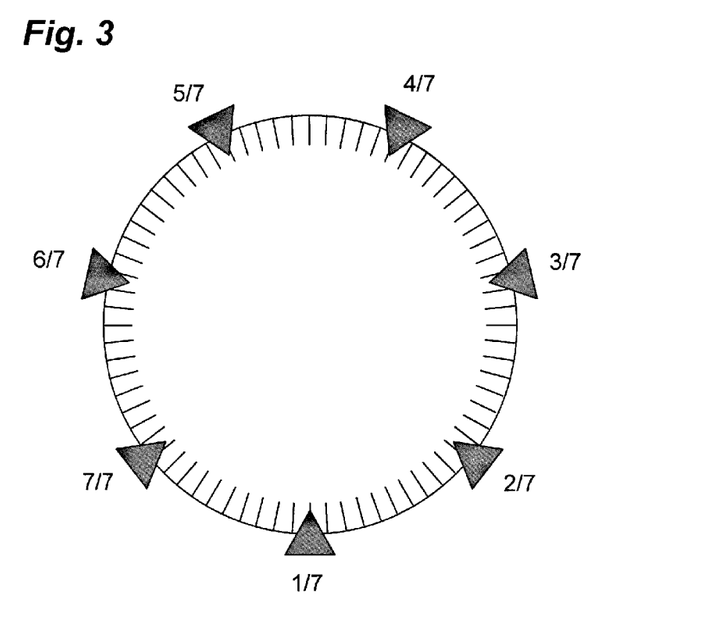
FIG. 3 is an arrangement diagram where seven sensor heads are arranged with an equiangular interval.
Figure 4:
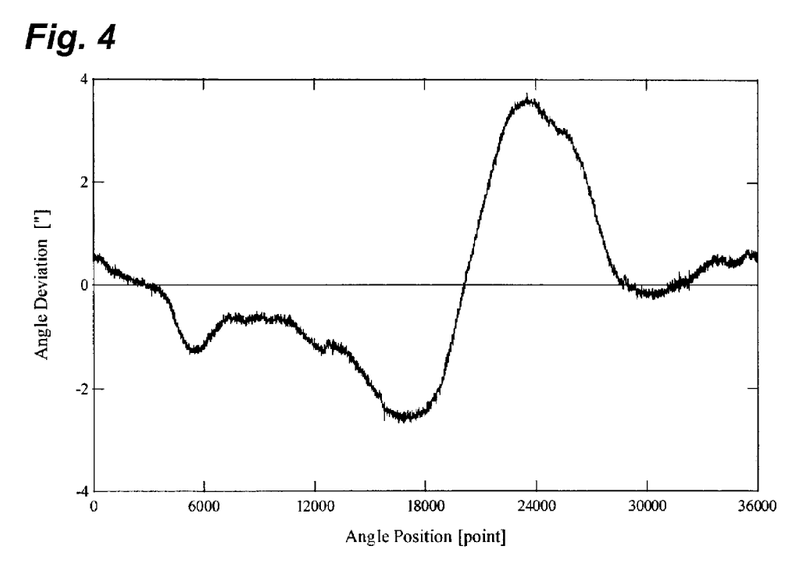
FIG. 4 is a figure illustrating calibration values obtained when seven sensor heads are arranged with an equiangular interval.
Figure 5:
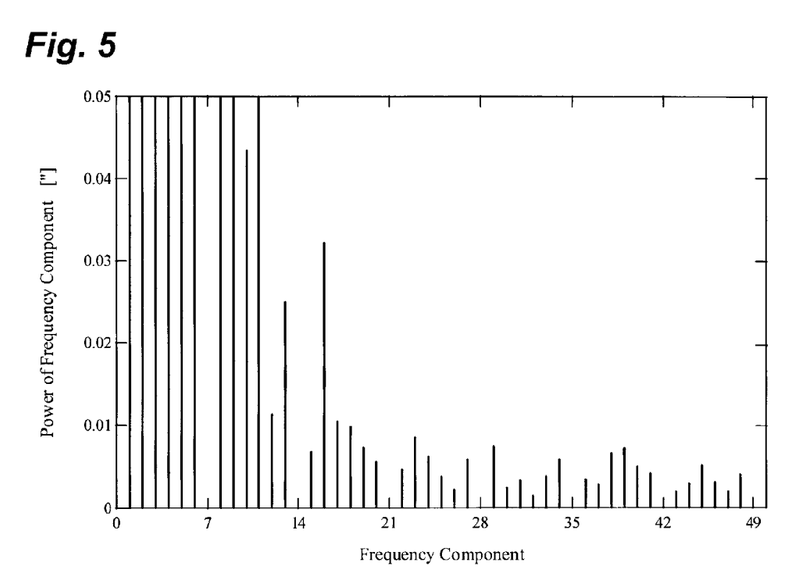
FIG. 5 is a figure illustrating a frequency component analysis result of the calibration values obtained when seven sensor heads are arranged with an equiangular interval.

In the above conventional technique, as shown in FIG. 3, when seven scale reading sensor heads are provided with an equiangular interval (360 degrees/7) at a circumference of a scale disc (the number of scale marks P=36,000) of a rotary encoder, the thus-obtained calibration values are shown in FIG. 4, and a frequency component analysis result of the calibration values are shown in FIG. 5.

Figure 6:
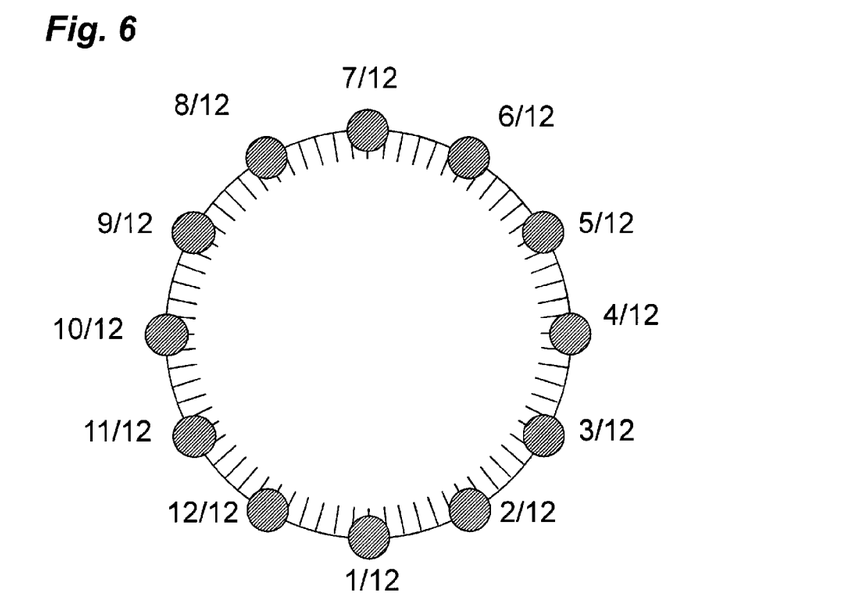
FIG. 6 is an arrangement diagram where twelve sensor heads are arranged with an equiangular interval.
Figure 7:
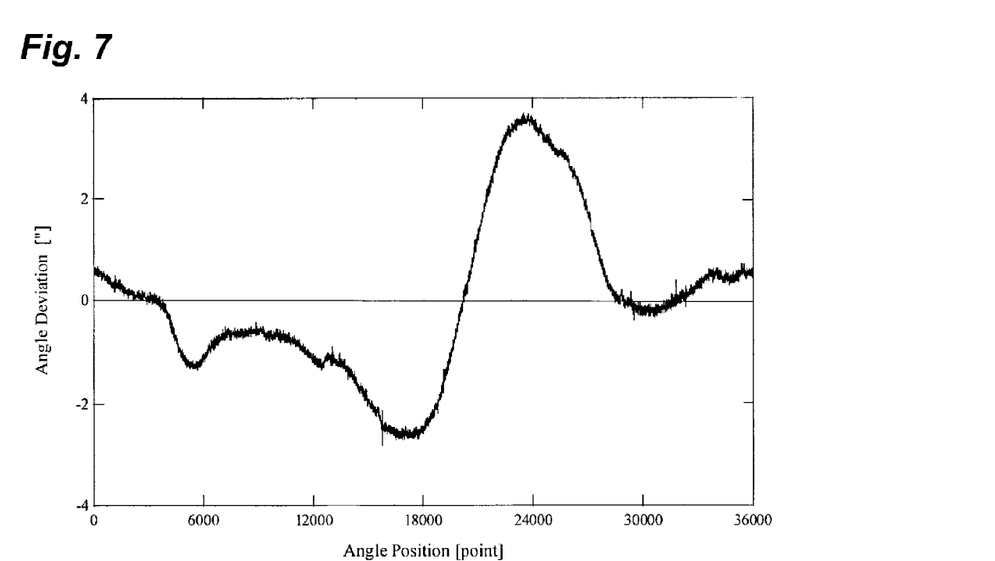
FIG. 7 is a figure illustrating calibration values obtained when twelve sensor heads are arranged with an equiangular interval.
Figure 8:
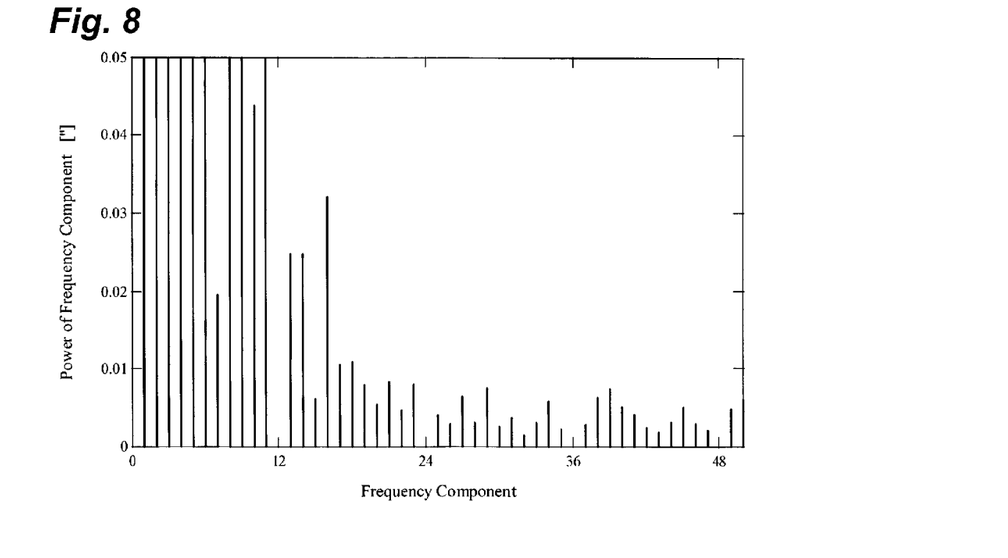
FIG. 8 is a figure illustrating a frequency component of the calibration values obtained when twelve sensor heads are arranged with an equiangular interval.

Likewise, as shown in FIG. 6, when twelve sensor heads are provided with an equiangular interval at the circumference of the scale disc of the rotary encoder, the thus-obtained calibration values are shown in FIG. 7, and a frequency component analysis result of the calibration values are shown in FIG. 8.

As is apparent from the above frequency component analysis results, when seven sensor heads are provided, it is impossible to obtain a component of a power of an integer multiple of seven, and when twelve sensor heads are provided, it is impossible to obtain a component of a power of an integer multiple of twelve.

In other words, when N sensor heads are provided with an equiangular interval on the scale disc, it is impossible to obtain a frequency component of a power of an integer multiple of N.

This is because, when using a property that can be mathematically proved with regard to any given periodic curve, i.e. "when, for any given positive integer N, an average of N curves each obtained by deviating the phase of any given periodic curve by 1/N of the cycle is obtained, a curve having only frequency components of powers of integer multiples of N among the frequency components of the original curve can be obtained", the second term at the right hand side of a calibration value SAV as shown in [Mathematical formula 3] of the Patent Literature 1 corresponds to the curve having frequency components of powers of integer multiples of N, and for this reason, the left hand side does not give any frequency components of powers of integer multiples of N.

In other words, in the expression as shown in paragraph 0005, $b_i = a_i$ holds, and thus, the following expression can be obtained.

$$SAV_i = \frac{1}{N} \sum_{j=1}^{N} SAj_i$$

$$= a_i - \frac{1}{N}(a_i + a_{i+P/N} + \cdots + a_{i+(j-1)P/N} + \cdots + a_{i+(N-1)P/N})$$

In this case, i=1, 2, 3, . . . , P denotes the numbers of the scale lines, and the second term at the right hand side is an average value of N curves each obtained by deviating $a_i$ by 1/N of the cycle. The left hand side is a calibration value obtained by subtracting frequency components of powers of integer multiples of N of $a_i$ from $a_i$.

In general, the angular error of the rotary encoder tends to involve many components of low powers, and tends to involve fewer components of high powers. Thus, in order to obtain highly accurate calibration values without losing components up to higher powers, there is no choice but to increase the number of sensor heads N provided with an equiangular interval, and this increases expensive sensor heads, which forces great increase in the cost.

Accordingly, it is an object of the present invention to obtain highly accurate calibration values, without losing components up to higher powers which are much higher than the powers obtained with the number of sensor heads used in the conventional technique, while the number of sensor heads is kept at the minimum number.

Solution to Problem

In order to solve the above problems, an angle detecting device with a self-calibration function according to the present invention, is an angle detecting device with a self-calibration function, the angle detecting device having sensor heads for reading a scale at a circumference of a scale disc fixed to a rotating shaft, wherein the angle detecting device with the self-calibration function has first sensor heads arranged with an equiangular interval at the circumference of the same scale disc, and a second sensor head arranged at a position of one of the first sensor heads in place of the one of the first sensor heads, and performs self-calibration by obtaining measurement differences between the second sensor head and the first sensor heads to determine average values thereof, wherein the first sensor heads and the second sensor head include a first group including L sensor heads arranged with an equiangular interval and a second group including M sensor heads arranged with an equiangular interval, and wherein the angle detecting device with the self-calibration function has phase shift means for shifting phases of the calibration values, obtained from the second group, by a scale of j*P/L (j=1 to L−1), where the total number of scale marks arranged on the scale disc is denoted as P, and calculation means for obtaining average values of the calibration values obtained from the second group and the (L−1) shifted calibration values obtained by the phase shift means, adding the average values to the calibration values obtained from the first group, and outputting the added values as calibration values, in which j is a natural number, and L and M are natural numbers where a least common denominator of L and M is larger than a sum of L and M.

One of the sensor heads arranged with the equiangular interval at the circumference of the same scale disc may be shared by the first group and the second group.

Advantageous Effects of Invention

In the angle detecting device with the self-calibration function according to the present invention, L sensor heads (for example, four sensor heads) are used in the first group of the first sensor heads and the second sensor heads, and M sensor heads (for example, seven sensor heads) are used in the second group of the first sensor heads and the second sensor heads, so that totally (M+N) sensor heads are used, and where the number of scale marks arranged on the scale disc is denoted as P, phases of the calibration values obtained from the second group are shifted by the scale of j*P/L (j=1 to L−1), average values of the calibration values obtained from the second group and the (L−1) shifted calibration values obtained by the phase shift means are obtained, the average values are added to the calibration values obtained from the first group, and the added values are output as calibration values, so that frequency components of powers of multiples of L, which cannot be obtained from the first group, can be compensated, and the calibration values can be accurately obtained up to the least common denominator of M and N, i.e. this allows obtaining the same level of accuracy as the case where as many sensor heads as the least common denominator of M and N are used.

When one of the sensor heads arranged with the equiangular interval at the circumference of the same scale disc is shared by the first group and the second group, the number of required sensor heads can be further reduced by one.

MODE FOR CARRYING OUT THE INVENTION

Examples

Figure 9:
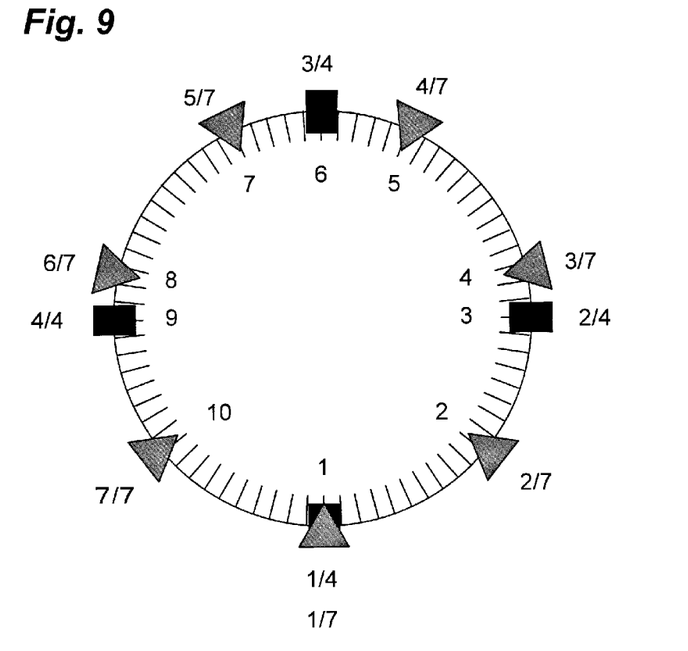
FIG. 9 is a figure illustrating an arrangement of a first group in which four sensor heads are arranged with an equiangular interval and a second group in which seven sensor heads are arranged with an equiangular interval, according to an example according to the present invention.

FIG. 9 illustrates an example, in which, with the position of 1 of a scale disc (the number of scale marks P=36,000) being a starting point, four sensor heads of 1/4 to 4/4 are arranged as a first group with an interval of 360°/4, likewise arrangement is made with the position of 1 of the scale disc being a starting point, seven sensor heads of 1/7 to 7/7 are arranged as a second group with an interval of 360°/7, and at the position of 1 of the scale disc, 1/4 for every 90° and 1/7 for every 360°/7 can be shared, and thus ten sensor heads are totally used.

In this example, the angle detecting device has the self-calibration function, by obtaining measurement differences between one sensor head and the other sensor heads, in each of the first group and the second group, as described in the Patent Literature 1, thus performing the self-calibration.

Figure 10:
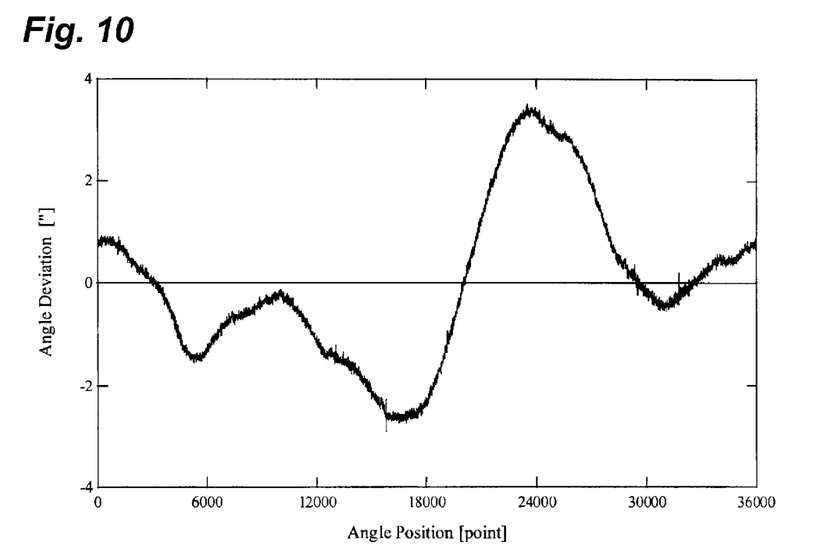
FIG. 10 is a figure illustrating calibration values obtained when four sensor heads are arranged with an equiangular interval.
Figure 11:
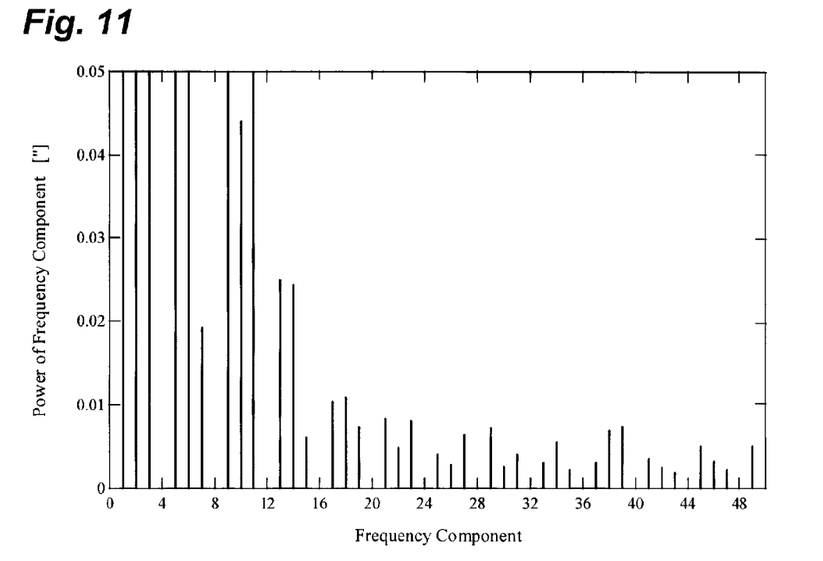
FIG. 11 is a figure illustrating a frequency component analysis result of the calibration values obtained when four sensor heads are arranged with an equiangular interval.

When seven sensor heads, i.e. 1/7 to 7/7, are arranged at every 360°/7, the calibration values with the self-calibration function described in the Patent Literature 1 and the frequency component analysis result of the calibration values are shown in FIGS. 4 and 5 explained as the conventional technique, and thus, when four sensor heads are arranged with an interval of 90° with the position of 1 of the scale disc being the starting point, the thus-obtained calibration values are shown in FIG. 10, and the frequency component analysis result of the calibration values is shown in FIG. 11.

As is apparent from the above explanation, in this case, it is impossible to obtain frequency components of powers of multiples of four (4, 8, 12 . . . ).

On the other hand, when seven sensor heads, i.e. 1/7 to 7/7, are arranged with an interval of 360°/7 with the position of 1 of the scale disc being the starting point, it is impossible to obtain components of powers of multiples of seven where seven sensor heads are arranged, and it is impossible to obtain components of powers of multiples of twelve where twelve sensor heads are arranged, as described above.

Accordingly, on the basis of the present invention, a procedure for obtaining calibration values will be explained, in which the calibration values are obtained from calibration values obtained when M sensor heads (in the example of FIG. 9, seven sensor heads) are arranged with an equiangular interval on the scale disc and L sensor heads (in the example of FIG. 9, four sensor heads) are arranged with an equiangular interval on the scale disc.

In this case, the calibration value obtained when M sensor heads are arranged is denoted as $\phi_i^{(-M)}$, and the calibration value obtained when L sensor heads are arranged is denoted as $\phi_i^{(-L)}$. (−M) indicates that $\phi_i^{(-M)}$ does not include any frequency component of a power of a multiple of M. (−L) means in the same manner.

Further, i is a scale number of the scale disc (i=1, 2, 3, . . . P), and P denotes the total number of scale marks in one circle of the scale disc.

First, L pieces of data $\phi_{i+(j-1)P/L}^{(-M)}$ each obtained by deviating $\phi_i^{(-M)}$ by $$j\frac{P}{L}$$

are generated.

j is 1, 2, 3, . . . L.

Then, an average value $\mu_i^{(-M,L)}$ of the L pieces of data $\phi_{i+(j-1)P/L}^{(-M)}$ is obtained, as follows.

$$\mu_i^{(-M,L)} = \frac{1}{L}\sum_{j=1}^{L}\varphi_{i+(j-1)\frac{P}{L}}^{(-M)}$$

In general, the property that can be proved mathematically with regard to any given periodic curve, i.e. "when, for any given positive integer N, an average of N curves each obtained by deviating the phase of any given periodic curve by 1/N of the cycle is obtained, a curve having only frequency components of powers of integer multiples of N among the frequency components of the original curve can be obtained", is mathematically proved.

In other words, $\mu_i^{(-M,L)}$ is a value having frequency components of powers of multiples of L, but not having frequency components of powers of multiples of M.

Then, a sum of $\phi_i^{(-L)}$ and $\mu_i^{(-M,L)}$ is calculated, as follows.

$$\phi_i^{(-M\times L)} = \phi_i^{(-L)} + \mu_i^{(-M,L)}$$

As described above, by compensating the frequency components of powers of multiples of L which lack $\phi_i^{(-L)}$ with $\mu_i^{(-M,L)}$, a calibration value $\phi_i^{(-M\times L)}$ can be obtained, with which a frequency component of a power of a multiple of a least common denominator of M and L cannot be obtained.

Figure 12:
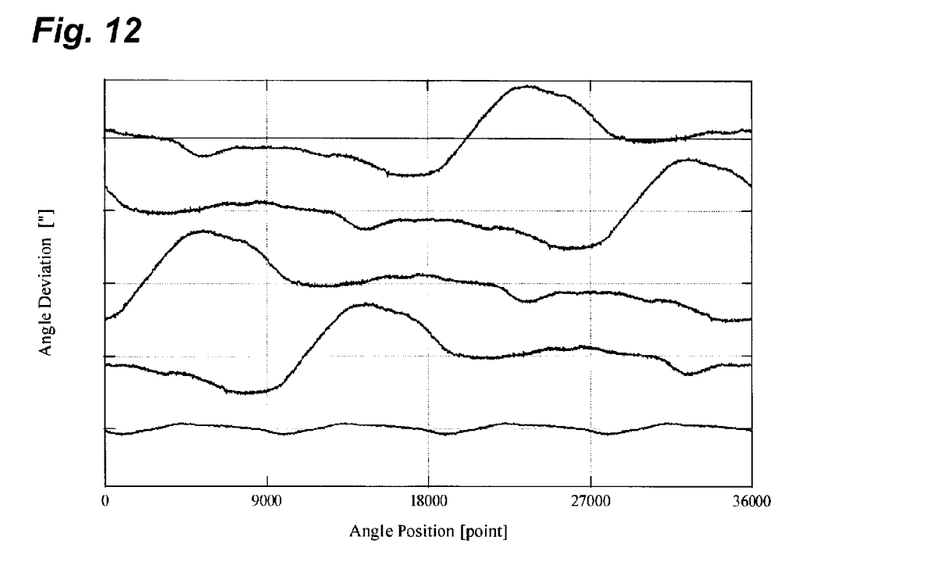
FIG. 12 is a figure, according to the example according to the present invention, in which calibration values (the first curve from the above) based on the second group in which seven sensor heads are arranged with an equiangular interval is phase-shifted by 9,000 scale marks (where the total number of scale marks is 36,000), so that the second, third, and fourth curves are generated, and in addition, values obtained from average values of those four curved lines are represented by the fifth curved line.

In the above example, as shown in FIG. 12, when the total number of scale marks of the scale disc is 36,000 (scale marks at every 0.01 degrees), $\phi_i^{(-7)}$ is shifted by 36,000/4 scale marks, i.e. 9,000 scale marks, to generate $\phi_{i+(j-1)36000/4}^{(-7)}$, (j=1, 2, 3, 4)(i=1, 2, ... 36,000).

The respective values are represented by four curved lines at the upper portion of FIG. 12, and the average value thereof $\mu_i^{(-7,4)}$ is the curved line at the lowermost portion of FIG. 12.

Figure 13:
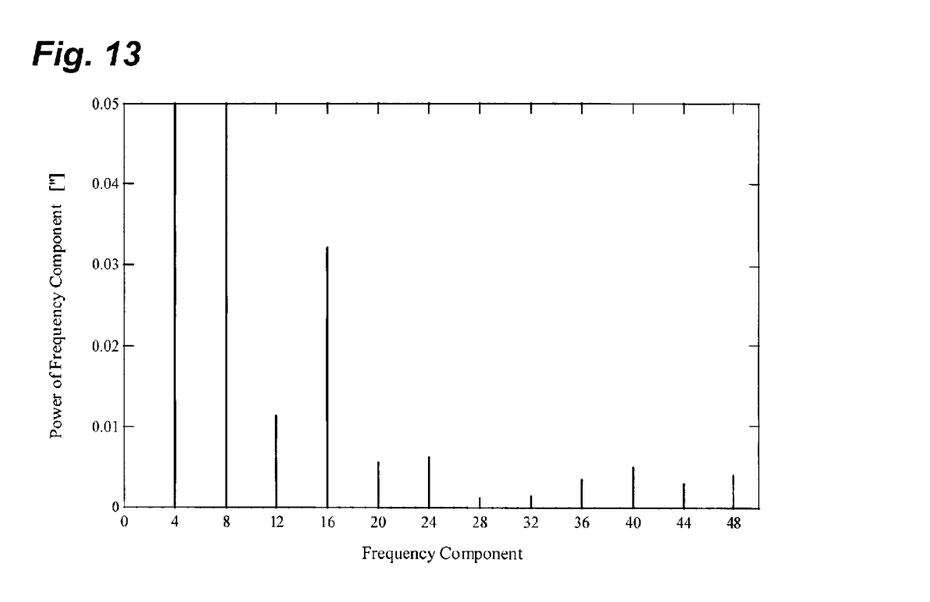
FIG. 13 is a figure illustrating calibration values based on the second group in which seven sensor heads are arranged with an equiangular interval, and a frequency component analysis result of average values of three curved lines obtained by shifting by 9,000 scale marks, according to the example according to the present invention.

When the frequency components of this $\mu_i^{(-7,4)}$ are calculated, they include only frequency components of powers of multiples of four, as shown in FIG. 13. However, the components of powers of multiples of seven are not included. In other words, the components of powers of multiples of twenty eight are not included.

Figure 14:
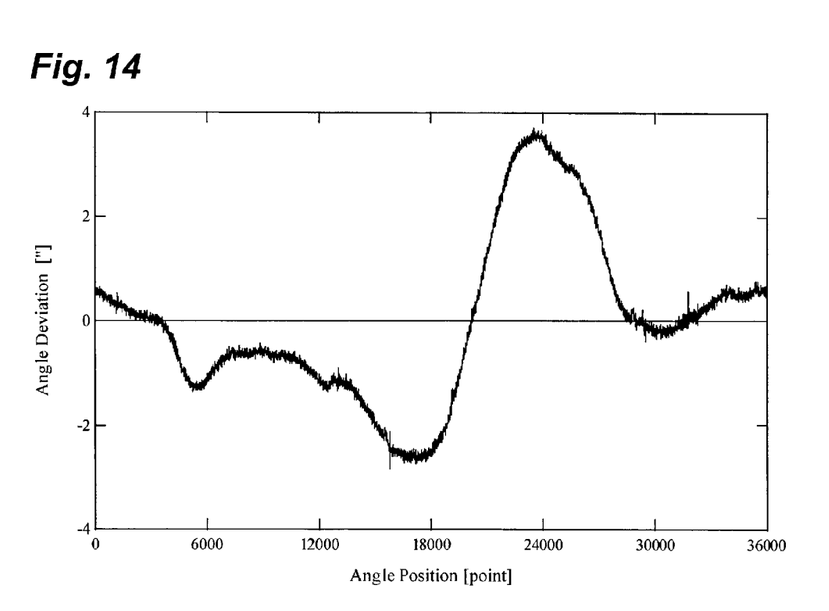
FIG. 14 is a figure illustrating calibration values, according to the example according to the present invention, obtained by adding the fifth curved line from the top obtained from the second group in which seven sensor heads are arranged with an equiangular interval, as shown in FIG. 12, and the calibration values obtained from the first group in which four sensor heads are arranged with an equiangular interval, as shown in FIG. 10.
Figure 15:
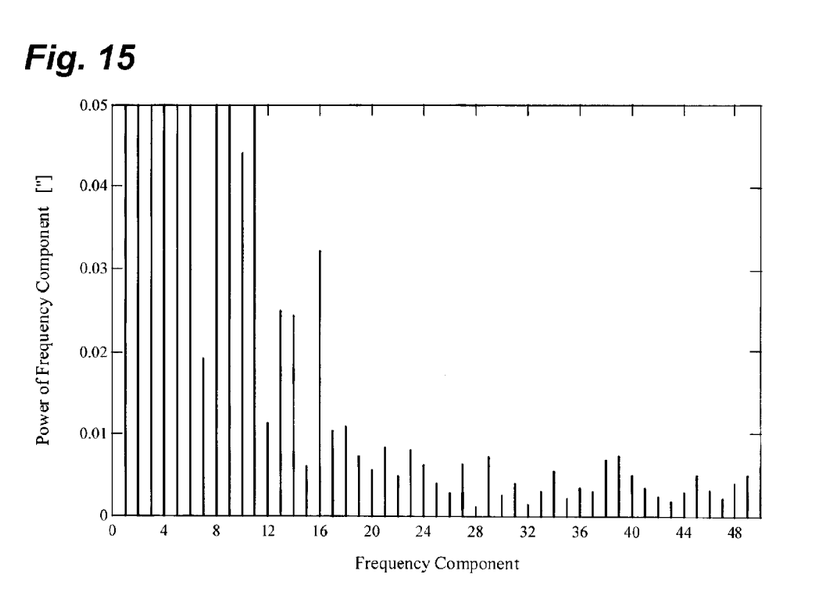
FIG. 15 is a figure illustrating a frequency component analysis result of calibration values, according to the example according to the present invention.

Therefore, by calculating a simple sum of this average value $\mu_i^{(-7,4)}$ and $\phi_i^{(-4)}$, as shown in FIG. 10, the calibration values, as shown in FIG. 14, can be obtained, from the calibration values obtained when seven sensor heads are arranged with an equiangular interval on the scale disc, and the calibration values obtained when four sensor heads are arranged with an equiangular interval on the scale disc, without performing any frequency analysis, such as Fourier-transform and inverse Fourier transform, but with using the four fundamental operations of arithmetic performed on the calibration values, in which frequencies of powers of multiples of the least common denominator of 7 and 4, i.e. 28, cannot be obtained with the calibration values. In the frequency component analysis result, the components of the first to twenty-seventh powers can be obtained as the calibration values, as shown in FIG. 15. More specifically, this is expressed as follows.

$$\phi_i^{(-7\times 4)} = \phi_i^{(-4)} + \mu_i^{(-7,4)} = \phi_i^{(-28)}$$

As described above, when twelve sensor heads are used, as shown in FIG. 6, it used to be impossible to obtain frequency components of the twelfth, twenty fourth, ... powers in the conventional technique, but in the above example, the frequency components of the first to twenty-seventh powers can be obtained with the ten sensor heads.

In the above example, at the position of 1 of the scale disc, 1/4 for every 90° and 1/7 for every 360°/7 can be shared, and thus the number of sensor heads can be further reduced by one.

INDUSTRIAL APPLICABILITY

In the present invention, while the number of expensive sensor heads to be used is reduced, a rotation angle can be detected with components of high powers. Therefore, the present invention can be widely and effectively used, without greatly increasing the cost, in particular, in industrial fields in which it is necessary to measure the rotation angle with a high degree of accuracy.

REFERENCE SIGNS LIST

11 First angle detecting device
12 First sensor head provided in the first angle detecting device
13 Second angle detecting device
14 Second sensor head provided in the second angle detecting device

The invention claimed is:
1. An angle detecting device with a self-calibration function, having sensor heads for reading a scale at a circumference of a scale disc fixed to a rotating shaft, in which the angle detecting device has: first sensor heads arranged with an equiangular interval at the circumference of the scale disc; and a second sensor head arranged at a position of one of the first sensor heads in place of the one of the first sensor heads, and in which the angle detecting device performs self-calibration, by obtaining measurement differences between the second sensor head and the first sensor heads, to determine average values thereof,
with the first sensor heads and the second sensor head comprising a first group including L sensor heads arranged with an equiangular interval and a second group including M sensor heads arranged with an equiangular interval,
wherein the angle detecting device with the self-calibration function comprises:
phase shifter for shifting phases of the calibration values, obtained from the second group, by a scale of j*P/L(j=1 to L−1), where the total number of scale marks arranged on the scale disc is denoted as P; and
calculator for obtaining average values of the calibration values obtained from the second group and the (L−1) shifted calibration values obtained by the phase shifter, adding the average values to the calibration values obtained from the first group, and outputting the added values as calibration values,
in which j is a natural number, and L and M are natural numbers where a least common denominator of L and M is larger than a sum of L and M.
2. The angle detecting device with the self-calibration function according to claim 1, wherein one sensor head is shared by the first group and the second group.

* * * * *